US008909791B2

(12) United States Patent
Cabasse et al.

(10) Patent No.: US 8,909,791 B2
(45) Date of Patent: Dec. 9, 2014

(54) MULTIMEDIA COMMUNICATION IN A VIRTUAL ENVIRONMENT

(75) Inventors: Gilbert Cabasse, Brest (FR); Fabrice Bonnaud, Brest (FR)

(73) Assignee: Alcatel Lucent, Boulogne-Billancourt (FR)

( * ) Notice: Subject to any disclaimer, the term of this patent is extended or adjusted under 35 U.S.C. 154(b) by 508 days.

(21) Appl. No.: 13/148,442

(22) PCT Filed: Feb. 1, 2010

(86) PCT No.: PCT/FR2010/050155
§ 371 (c)(1),
(2), (4) Date: Nov. 14, 2011

(87) PCT Pub. No.: WO2010/092276
PCT Pub. Date: Aug. 19, 2010

(65) Prior Publication Data
US 2012/0059941 A1     Mar. 8, 2012

(30) Foreign Application Priority Data

Feb. 10, 2009   (FR) ...................................... 09 50817

(51) Int. Cl.
G06F 15/16        (2006.01)
H04L 29/08        (2006.01)
G06Q 10/10        (2012.01)
H04L 12/18        (2006.01)
H04L 29/06        (2006.01)
H04N 7/15         (2006.01)

(52) U.S. Cl.
CPC .............. H04L 67/24 (2013.01); G06Q 10/10 (2013.01); H04L 12/1822 (2013.01); H04L 67/148 (2013.01); H04L 67/38 (2013.01); H04L 63/10 (2013.01); H04N 7/157 (2013.01); H04L 65/403 (2013.01); H04L 67/306 (2013.01); H04L 67/14 (2013.01)
USPC ...................................................... 709/227

(58) Field of Classification Search
USPC ......................................................... 709/227
See application file for complete search history.

(56) References Cited

U.S. PATENT DOCUMENTS 7,124,164 B1    10/2006   Chemtob
8,064,487 B1 *  11/2011   Armstrong et al. ........... 370/546
(Continued)

FOREIGN PATENT DOCUMENTS

EP    0 950 956 A1    10/1999
EP    1 473 650 A1    11/2004
(Continued)

OTHER PUBLICATIONS

Honda S. et al., "A Virtual Office Environment Based on a Shared Room Realizing Awareness Space and Transmitting Awareness Information," Proceedings of the International Symposium on Human Factors Intelecommunications, XP002074473, pp. 287-295, May 12, 1997.
International Search Report for PCT/FR2010/050155 dated Jul. 2, 2010.

*Primary Examiner* — Larry Donaghue
(74) *Attorney, Agent, or Firm* — Fay Sharpe LLP

(57) ABSTRACT

To set up a multimedia communication between a visiting user and a visited user who are initially present respectively in different virtual spaces in a virtual environment managed by a server (SC) to which the respective terminals (TC) of the visiting user and the visited user are connected via a packet network (RP), the server sets up a video communication between the visited user and the visiting user, following a virtual movement of the visiting user within a virtual space providing access to the space in which the visited user is present, and sets up an audio communication between the visited user and the visiting user, following a virtual movement of the visiting user into the space in which the visited user is present.

18 Claims, 2 Drawing Sheets

(56) References Cited

U.S. PATENT DOCUMENTS

Figure 1:
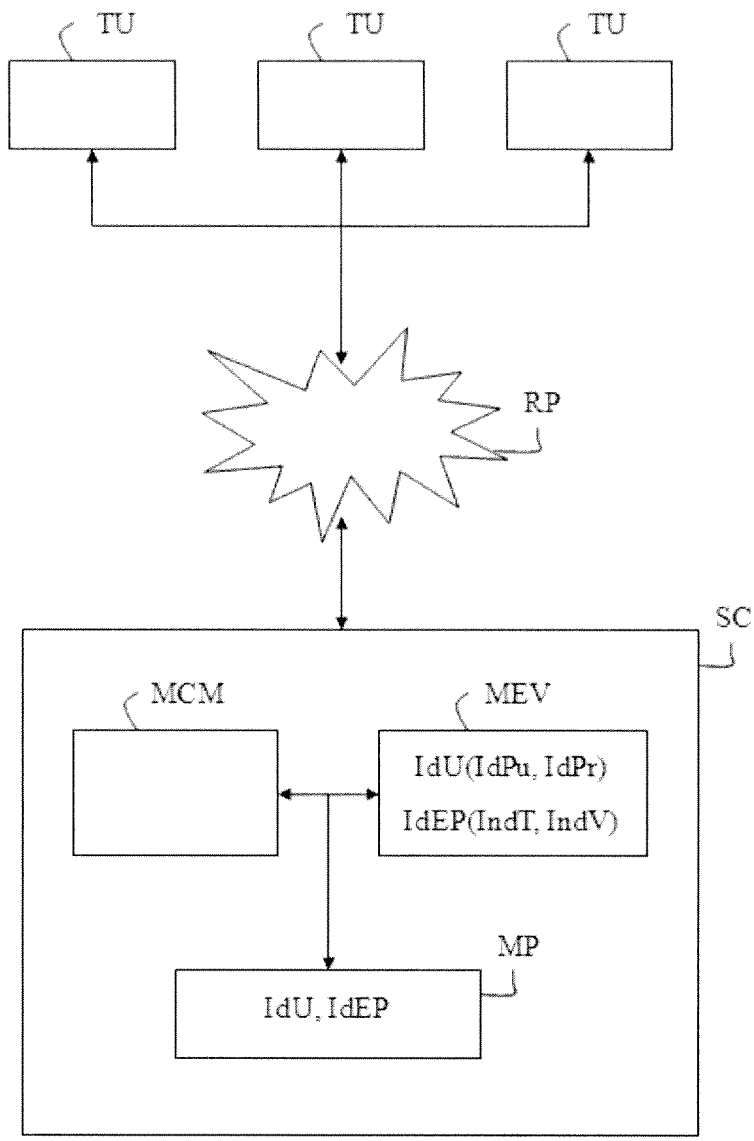

| | | | |
|---|---|---|---|
| 8,191,001 B2 * | 5/2012 | Van Wie et al. | 715/757 |
| 8,279,254 B2 * | 10/2012 | Goose et al. | 348/14.01 |
| 2002/0109680 A1 * | 8/2002 | Orbanes et al. | 345/418 |
| 2002/0120876 A1 * | 8/2002 | Pearson et al. | 713/201 |
| 2004/0189701 A1 * | 9/2004 | Badt, Jr. | 345/753 |
| 2007/0011273 A1 | 1/2007 | Greenstein et al. | |
| 2007/0050716 A1 | 3/2007 | Leahy et al. | |
| 2008/0109878 A1 | 5/2008 | Delegue et al. | |
| 2008/0215994 A1 * | 9/2008 | Harrison et al. | 715/757 |
| 2008/0298571 A1 | 12/2008 | Kurtz et al. | |
| 2008/0303811 A1 | 12/2008 | Van Luchene | |

FOREIGN PATENT DOCUMENTS

| | | |
|---|---|---|
| WO | WO 2008/052972 A1 | 5/2008 |
| WO | WO 2008/106196 A1 | 9/2009 |

* cited by examiner

MULTIMEDIA COMMUNICATION IN A VIRTUAL ENVIRONMENT

The present invention relates to multimedia communications in a virtual environment. More particularly, the invention relates to the setting up of video and audio communications between users capable of moving virtually within a virtual environment.

Instant messaging systems enable a user to be seen by other users as "busy". For example, if the user is in a phone conversation, he might want for another user to either join the conversation or wait for the conversation to be over.

Whenever a first user wishes to speak with a second user, it is desirable for the first user to call the second user at an appropriate time, particularly if the subject of the call is not an emergency.

In a company, coworkers may communicate with one another regarding urgent subjects, or in a more informal manner, or regarding less urgent subjects. It is considered normal for a coworker to bother another coworker for an urgent communication. Coworkers may have a conversation during informal contacts whenever they physically encounter one another, such as in a hallway or near a coffee machine. Whenever coworkers do not work in the same place, in the event that the company is spread across multiple sites or that a coworker is working remotely, informal contacts between coworkers are not natural because a coworker generally does not want to bother another coworker by calling him or her for a subject that is not a priority or urgent.

Furthermore, a user who wishes to call another user does not have any relevant indicator regarding said other user's specific task. A simple "busy" indicator broadcast by a user to the multiple users who are potential callers must not prevent an employee from setting up contact in order to collaborate on the task being executed by the user. Because a user frequently switches tasks, and because the priorities between the tasks vary very often, it is difficult for the user to filter calls based on indicators or formal rules.

It is an objective of the invention to remedy the aforementioned drawbacks by virtually simulating interactions between at least two users who encounter one another physically.

In order to achieve this objective, a method for setting up a multimedia communication between a visiting user and at least one visiting user who are initially present respectively within different virtual spaces in a virtual environment managed by a server to which the respective terminals of the visiting user and the visited user are connected, is characterized in that it comprises the following steps:

following a virtual movement of the visiting user within a virtual space providing access to the virtual space in which the visited user is present, a video communication is set up between the visited user and the visiting user, and following a virtual movement of the visiting user in the space in which the visited user is present, an audio communication is set up between the visited user and the visiting user.

Advantageously, the invention enables users to employ a video communication first in order to share their availabilities and intentions, before using audio communication second for a spoken discussion.

Advantageously, the invention encourages informal contacts between the visited the user and the visiting user, who are for example remote employees of a company, the distance being due, for example, to remote working or the company having locations at multiple sites.

The visiting user may judge whether he or she may disrupt the visited user, and the visited user, even if he or she is busy, can send signals to the visiting user.

As in "real" life, a visual link is set up before an audible link, and the visual link may be set up even if the called party is busy.

According to a first characteristic of the invention, the visited user may receive a visual and/or audible notice after the virtual movement of the visiting user into the virtual space providing access to the virtual space in which the visited user is present, before the video communication between the visited user and the visiting user is set up.

According to another characteristic of the invention, the visiting user may be moved virtually into the virtual space in which the visited user is present upon the visiting user's request, if the visited user had previously authorized the visiting user to access the virtual space within which the visited user is present. The visiting user may also be moved virtually into the virtual space in which the visited user is present, upon the visited user's request.

According to another characteristic of the invention, during the video communication between the visited user and the visiting user, the visiting user might not receive any video communication flow emitted by the visited user, and it is possible that the visited user might not receive any video communication flow emitted by the visiting user.

The invention also pertains to a server for setting up a multimedia communication between a visited user and at least one visiting user who are initially present respectively within different virtual spaces in a virtual environment managed by the server to which the respective terminals of the visiting and visited users are connected, characterized in that it comprises:

means for setting up a video communication between the visited user and the visiting user, following a virtual movement of the visiting user into a virtual space providing access to the virtual space in which the visited user is present, and means for setting up an audio communication between the visited user and the visiting user, following a virtual movement of the visiting user into the virtual space within which the visited user is present.

The invention also pertains to a computer program capable of being implemented within a server, said program comprising instructions which, whenever the program is executed within said server, carry out the steps according to the inventive method.

Figure 2:
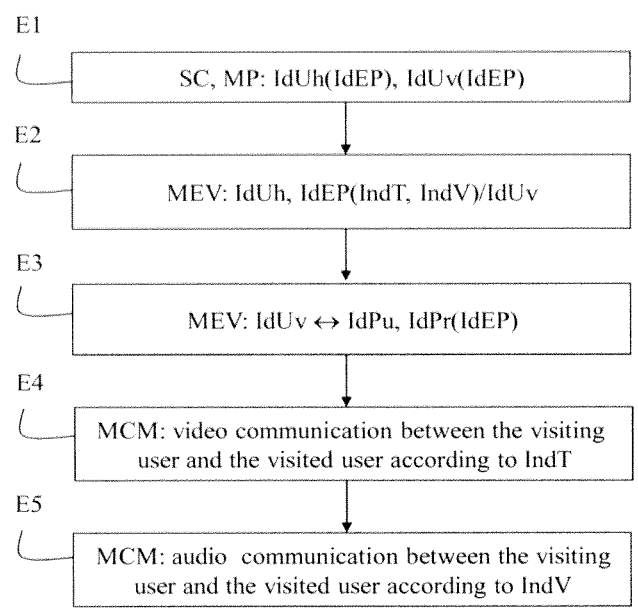

The present invention and the benefits thereof shall be better understood upon examining the description below, which makes reference to the attached figures, in which:

FIG. 1 is a schematic block diagram of a communication system for setting up a multimedia conference between at least two users over a packet network according to the invention; and FIG. 2 is an algorithm of a method for setting up a multimedia conference between at least two users over a packet network according to the invention.

With reference to FIG. 1, a communication system according to one embodiment of the invention comprises a communication server SC and a set of user terminals TU communicating with one another via a packet network RP.

The packet network RP is, for example, an IP ("Internet Protocol") high-speed network such as the Internet or an intranet, or even a company-specific private network. For example, each of the terminals TU. TC2, and TC3 may be a personal computer or an intelligent terminal that may communicate with the packet network via a wired or wireless connection.

Each terminal TU comprises means for setting up a multimedia communication, such as a videoconference, these means particularly including a camera, a screen, a microphone, and speakers. Each terminal further comprises a software interface enabling the user to execute services offered by the communication server SC, and particularly to set up multimedia communications with other users by moving themselves within the virtual environment.

In particular, when two users are in a video communication, each user sees on his or her terminal's screen the video of the other user taken by means of the camera, and whenever both users are in an audio communication, each user listens via the speakers to the voice of the other user picked up using the microphone.

The communication server SC comprises a virtual space module MEV, a presence module MP and a multimedia communication module MCM.

As an alternative, the functionalities of the virtual space module MEV, the presence module MP, and the multimedia communication module MCM are respectively incorporated into separate servers that communicate with one another.

As an alternative, the functionalities of the virtual space module MEV, the presence module MP, and/or the multimedia communication module MCM are incorporated into each terminal TU, the server SC being restricted in such a case to bringing these modules in contact with one another.

In the remainder of the description, the term module may designate a device, a software program, or a combination of computer hardware and software, configured to execute at least one particular task.

The virtual space module MEV determines the virtual environment comprising one or more public virtual spaces and private virtual phases Each public virtual space enables access to one or more private virtual spaces.

The virtual space module MEV also determines the location of a private virtual space, known as a personal space, for each user within the virtual environment.

For example, the virtual environment corresponds to a schematic depiction of the arrangement of a company's offices, each public virtual space corresponding to a hallway and each private virtual space corresponding to an office accessible from a hallway.

Each user possesses a private virtual space of his or her own, within which he or she may perform certain actions described below. Such a user may be likened to the owner of an office. The inventive communication system enables a user to visit another user, for example in order to have a video communication or a video and audio communication with that user.

For a better understanding of the invention, a first user present within a given virtual space, whether private or public, is considered to be "visited," while a second user who arrives in that given virtual space in which the first user is already present, is considered to be "visiting". Generally, the visited user is present in the private virtual space of his or her own.

Virtually speaking, each private virtual space has a door, or a similar metaphor, which may be locked or unlocked. The door corresponds to access to the private virtual space from the public virtual space. If the door is unlocked, a visitor may enter the private virtual space on his or her own initiative. If the doors locked, a visitor may enter the private virtual space only on the initiative of the visited user, who controls the private virtual space, and/or one of the users already virtually present within the visited user's private space.

Each private virtual space, called an office below, also has a window, or a similar metaphor, which may have three levels of transparency with respect to the public virtual space, hereafter known as the hallway: transparent, semi-transparent, and opaque.

If the window is transparent, a visitor in the hallway may see the visited user within the office, and the visited user can see the visitor within the hallway.

If the window is semi-transparent, a visitor in the hallway cannot see the visited user in the office, while the visited user can see the visitor in the hallway.

If the window is opaque, a visitor in the hallway cannot see the visited user in the office, and the visited user cannot see the visitor in the hallway.

Thus, the visiting user can control his or her visibility for a visitor in the hallway, and the visitor is informed of whether or not he or she can be seen by the visited user.

The presence module MP updates the present status of each user who has registered with the communication server SC. Whenever a user is registered with the communication server SC, the presence module MP creates a user profile that particularly comprises an identification IdU of the user.

Whenever the terminal TU is connected to the communication server SC, the user's identifier IdU is in the "connected" state, and when the user's terminal TU is disconnected from the communication server SC, the user's identifier IdU is in the "disconnected" state.

Furthermore, the presence module MP saves each user indicator IdU as a match for an identifier of the user's terminal, in order to set up multimedia communications between the users' terminals.

Whenever the user desires to move within the virtual environment, the user may select a virtual space, which is either public or private, using a human-machine interface of the user's terminal. In cooperation with the presence module MP, the virtual space module MEV determines the location of the user within the virtual environment in real-time, such as by associating the user's identifier IdU with an identifier of the virtual space selected by the user.

Initially, each user possesses the personal space that is a private virtual space controlled by the user. In such a case, the user's profile comprises, in addition to the user's identifier IdU, an identifier IdEP of the personal space.

Optionally, other users, who are authorized to use the services offered by the server SC, have no personal spaces and are initially present within a public virtual space. Such users may nonetheless visit other users within their own personal spaces.

Whenever the user selects a public virtual space, the user is moved directly into that public virtual space. In this situation, the user's identifier IdU is associated with an identifier IdPu of the public virtual space.

Whenever the user selects a private virtual space, the user is moved into the public virtual space enabling access to that private virtual space. In this situation, the user's identifier IdU is associated both with an identifier IdPu of the public virtual space and with an identifier IdPr of the private virtual space.

The user's identifier IdU and the personal space identifier IdEP are considered connected to one another, while the user's identifier IdU may be temporarily associated with a virtual space identifier IdPr or IDPu whenever the user moves within that virtual space. It shall be understood that the personal space identifier IdEP for of visited user corresponds to an identifier IdPr of a private virtual space selected by the visiting user.

According to one embodiment of the invention, via a human-machine interface of the terminal, a public virtual space and the corresponding private virtual spaces, i.e. those accessible from the public virtual space, may be depicted by a list of usernames, with the title of the list corresponding to the public virtual space and the name of the user corresponding to the private virtual space associated with the user. According to other examples, a private virtual space may correspond to an image or pseudonym of a user.

Whenever the user selects the title of the list, the user is moved within the hallway, without being in front of a user's office.

Whenever the user, who is said to be "visiting", selects the name of a user, who is said to be "visited", the user is moved within the hallway to be in front of the visiting user's office. In this situation, a video communication is automatically set up between the visiting user and the visited user, as a function of the level of transparency in the visited user's office window.

If the window is transparent, the visiting and visited user respectively receive a video flow from the visited and visiting user.

If the window is opaque, the visiting and visited user respectively receive no video flow from the visited and visiting user.

If the window is semi transparent, the visited user receives a video flow from the visiting user, while the visiting user receives no video flow from the visiting user. Optionally, the visitor is informed, via a graphical notice and/or audible signal, that the window is semi-transparent, and therefore that he or she may be seen by the visited user. Furthermore, the visited user has the option of configuring the window's levels of transparency respectively for some visitors, and a default level of transparency for all other visitors.

To that end, the virtual space module MEV initially associates a transparency indicator IndT with the personal space identifier IdEP controlled by the visited user. Under the control of the visited user, the module MEV sets the transparency indicator IndT to a state "T" if the window is transparent (IndT="T"), to a state "ST" if the window is semi-transparent (IndT="ST"), or to a state "O" if the window is opaque (IndT="T").

It may be assumed that the door of a private space is locked with respect to the public space providing access to the private space, meeting with respect to a visitor who wishes to enter the private space. Any user, whether visited or visiting, who is already present in the private space may order the door opened in order to specifically send in another user who is waiting in the public space, without changing the door's lock status. Furthermore, the user who owns the personal space may be considered to be holding a badge that enables him or her to enter or leave the personal space without changing the lock status of the personal space's door.

Furthermore, if the visited user configures the window's transparency levels respectively for some users, the module MEV each associates three transparency indicators IndT of each state with a list of user identifiers IdU.

Thus, whenever a visitor wishes to visit a visited user by selecting the visiting user's name, the module MEV identifies the visited user's identifier IdU and searches for the personal space identifier IdEP linked to the identifier IdU within the visiting user's user profile.

The module MEV then analyzes the state of the transparency indicator IndT associated with the identifier IdEP. If the identifier IdEP is associated with the various transparency indicators IndT of each state, the module MEV identifies the transparency indicator IndT that is associated with the list containing the identifier IdU in order to determine the possible video flows.

Furthermore, the virtual space module MEV initially associates a lock indicator IndV with the personal space identifier IdEP controlled by the visiting user, to indicate whether the office's door is locked or not. On the order of the visited user, the module MEV set the lock indicator IndV to a state "0" if the door is unlocked (IndV="0"), or to a state "1" if the door is locked (IndV="1"). If the door is locked, a visitor in front of the office cannot enter on his or her own initiative.

Optionally, as for the transparency indicator IndT, the visiting user has the option of configuring the door's lock state for some visitors, and a default lock state for all other visitors.

According to one embodiment of the invention, via a human-machine interface of the terminal, each user has different graphical areas on his or her terminal screen. For example, the various graphical areas comprise a contact area in which the list of usernames appears, a presence area depicting a virtual space in which the user is present, and an access area representing the virtual space(s) accessible from the virtual space in which the user is present. The accessible virtual space is, for example, a virtual space to which the user wishes to go.

For example, whenever a visitor selects the visited user's name, the visitor is moved into the hallway in front of the visited user's office. On the screen of the visiting user's terminal, the presence area depicts the hallway where the visiting user is present, and the access area depicts the office to which the visiting user wishes to go. On the screen of the visited user's terminal, the presence area depicts the office where the visited user is present, and the access area depicts the hallway accessible from the office.

Whenever a visitor selects the visited user's name, the visitor is moved into the hallway in front of the visited user's office. A video communication is automatically set up between the visiting user and the visited user, as a function of the level of transparency in the visited user's office window. Optionally, prior to the setting up of the video communication, an image of the visitor, such as a photograph and/or pseudonym of the visitor, appears in the visited user's access area, and an audible notice, such as a noise of footsteps, is produced in order to notify the visited user that the visitor located within the hallway is ready to enter into video communication, and potentially audio communication, with the visited user. The audible notice is, for example, produced several seconds before the video communication is set up.

On the terminal's screen, the visiting user, as well as the visited user, may view the videos of the visited and visiting users, respectively in the areas depicting the office and the hallway, whenever the window is transparent, i.e. when the transparency indicator IndT associated with the office's identifier IdEP is in the state "T" with respect to the visiting user's identifier IdU. As examples, the visited user may send signals to the visiting user indicating his or her state of busyness or availability to him or her, and the visiting user may explain using gestures the importance of his or her visit.

Optionally, after the video communication between the visiting and visited users is net up, when the visitor is waiting in the hallway in front of the visited user's office, the visiting user may notify the visited user of his or her presence by one or more audible notifications of one or more types. According to one example, an audible notification is discrete and quiet, and may correspond to an action of tapping on the visited user's door in order to indicate the visiting user's presence. According to another example, an audible notification is louder and may correspond to an action of knocking on the visited user's door in order to indicate the visiting user's intent to enter the visited user's office.

An audio communication may be established between the visited and visiting users upon the visited user's request. In this situation, it may be assumed that the visited user sends the visiting user into the office. Additionally, the virtual space module MEV associate the visited user's identifier IdU only with the office's identifier IdPr, and the visiting user's identifier IdU is no longer associated with the hallway's identifier IdPu because the visiting user is no longer in the hallway.

If the office's door is not locked, the visiting user may enter the office on his or her own initiative and thereby set up an audio communication with the visited user. If the office's door is locked, only the visited user may authorize the setting up of an audio communication.

For example, the visiting or visited user may request that audio communication be established via the terminal's human-machine interface by means of a voice command or interactive graphical area, such as a control button.

Furthermore, the list of usernames displayed within the contact area shows each user's "connected" or "disconnected" state, for example in a traditional way by means of a green or red dot in front of the user's name. Whenever a given user is not connected to the server SC, the other users may nonetheless optionally access the given user's personal space, such as to wait for the given user.

According to one example embodiment, in order to set up a video communication between visited and visiting users, the virtual space module MEV first determines the personal space identifier IdEP linked to the visited user's identifier IdU whenever the visiting user has selected the visited user's name. The module MEV then associates the visited user's identifier IdU with the identifier IdPu of the public space providing access to the visited user's personal space, as well as with the private space identifier IdPr corresponding to the personal space identifier IdEP.

The module MEV then analyzes the state of the transparency indicator IndT associated with the identifier IdEP with respect to the visiting user's identifier IdU. The module MEV orders the multimedia communication module MCM to set up a video communication between the visited and visiting users as a function of the state of the transparency indicator IndT.

The module MEV orders the multimedia communication module MOM to set up an audio communication between the visited and visiting users as a function of the state of the transparency indicator whenever one of them no requests. If the visiting user makes this request, the module MEV orders the multimedia communication module MCM only if the lock indicator IndV associated with the identifier IdEP is not in the locked state "1" compared with the visiting user's identifier IdU.

In one particular case, multiple users may be present within a public virtual space, for example while waiting to enter audio communication with particular visited users. Each of the users perceives, on his or her own terminal screen within the present scenario, a photograph and/or pseudonym of other users. The server SC may make a correlation between the identifiers of those users who are associated with the same public space identifier, in order to inform each user of the presence of the other users within that public space.

In another particular case, a first visitor and a second visitor may wish to visit one visited user in his or her office at the same time In this situation, the multimedia communication module MCM manages a multimedia conference whose video and audio feeds depend on the visitors' locations within the virtual environment.

According to a first option, both visitors are in the hallway in front of the visited user's office. In such a case, the visited user is in a video communication with both of the visitors, while the two visitors are in audio and video communication, which enables them, for example, to determine whether they will enter together, or if one of them has to come back later.

An alternative consists of not putting the two visiting users in communication with one another, while keeping them both informed of the presence of the other visiting user within the hallway, for example by displaying an image and/or the name of the other visitor in the presence area.

According to a second option, the first visitor is in the office while the second visitor is in the hallway In such a case, the visited user is in video and audio communication with the first visitor, while the second visitor is in video communication with the visited user and also with the first visitor.

According to a third option, the two visitors encounter one another in the visited user's office. In such a case, the visited user and the two visitors are in video and audio communication with one another.

With reference to FIG. 2, the method for setting up the conference according to one embodiment of the invention comprises steps E1 to E5 executed automatically within the inventive communication system.

Initially, at least two users are connected to the communication server SC. According to one embodiment of the invention, a first user said to be "visiting" wishes to speak to a second user said to be "visited".

In step E1, the terminals of the visited and visiting users, upon their request, launch a software application and connect to the communication server SC.

Whenever the visited or visiting server connects to the SC for the first time, the presence module MP creates a user profile within which an identifier IdU and identifier of the user's terminal are saved as a match.

To better understand the invention, the visiting user's identifier is known as IdUv and the visited user's identifier is known as IdUh.

The presence module MP puts both of the users' identifiers IdUv and IdUh into the connected state.

Furthermore, the identifiers of the visited user IdUh and visiting user IdUv are respectively saved as matches with the identifiers IdEP of the personal spaces respectively controlled by the visited and visiting user.

In step E2, the visiting and visited users respectively configure their personal spaces. Below only the configuration of the visited user's personal space is described, as the configuration of the visiting user's personal space is similar.

In the visited user's user profile, the personal space identifier IdEP is saved as a match with a transparency indicator IndT and a lock indicator IndV.

On the order of the visited user, the module MEV puts the transparency indicator IndT into the "T", "ST" or "O" state compared to the visiting user's identifier IdUv, and also sets the lock indicator IndV to the state "0" or "1" in relation to the visiting user's identifier IdUv.

As an alternative, the steps E1 and E2 are carried out by an administrator of the server SC, who declares within the system the users' characteristics and their personal spaces. For example, the administrator decides which hallway each office will be in. For example, some users may be assigned offices in which the door must be unlocked and the window must be transparent.

In step E3, the visitor selects the user name of the visited user in the contact area for the purpose of visiting and speaking to the visited user in the visited user's personal space.

The module MEV identifies the visited user's identifier IdUh and searches for the private virtual space identifier IdPr corresponding to the personal space identifier IdEP linked to the identifier IdUh in the user profile of the visited user.

The module MEV temporarily associates the visiting user's identifier IdUv with the located identifier IdPr of the private virtual space, i.e. the visited user's personal space, and with the identifier IdPu of the public space that provides access to the visited user's personal space. The visiting user is thereby virtually moved within the public space providing access to the visited user's personal space.

After querying the module MEV of the server SC, the visited user's terminal displays, within the presence area, the video of the visiting user and an indication regarding the public virtual space, such as its name, which may be "hallway A" to inform the visitor of his or her location within the virtual environment. The terminal additionally displays, within the access area, an image, such as a photograph, of the visited user and an indication regarding the visited user's personal space, such as its name, which may be "visited user's office".

At the same time, the visited user's terminal also queries the module MEV of the server SC, or is notified by the module MEV, in order to update the information related to the other users within the virtual environment. In particular, the visited user's terminal displays within the presence area the video of the visited user and in indication regarding the visiting user's personal space, and additionally displays within the access area an image, such as a photograph, of the visited user and in indication regarding the public virtual space.

Optionally, an audible notification is produced in order to notify the visited user that the visiting user is located within the hallway and is ready to enter into communication with the visited user.

In step E4, in cooperation with the module MEV, the multimedia communication module MCM establishes a video communication between the visiting and visited users as a function of the state of the transparency indicator IndT associated with the personal space identifier IdEP.

For example, the transparency indicator IndT is in the state "T" and two-way video communication between the visiting and visited users is set up. In this situation, the visiting user's terminal displays within the access area the video of the visited user, and the visited user's terminal displays within the access area the video of the visiting user.

In step E5, the multimedia communication module MCM sets up an audio communication between the visited and visiting users whenever one of them requests so, after a virtual movement of the visiting user from the public virtual space into the visited user's personal space. If the visited user makes this request, the visiting user is moved into the visited user's personal space, and this audio communication is set up. If the visiting user makes this request, the module MCM queries the module MEV in order to verify the state of the lock indicator associated with the identifier IdEP. If the lock indicator IndV is in the state "0", the visiting user is virtually moved into the visited user's personal space and the audio communication is set up, whereas if the lock indicator IndV is in the state "1", the visiting user is not virtually moved into the visited user's personal space and the audio communication is denied and not set up. The visiting user is therefore virtually moved into the visited user's personal space upon the visiting user's request, if the visited user had previously authorized the visiting user to access his or her personal space.

Whenever this audio communication is set up, the visiting user is virtually moved from the public virtual space into the visited user's personal space. For the visiting user's terminal, the presence area now corresponds to the visited user's personal space, and the access area now corresponds to the virtual public space.

Furthermore, the visiting and visited users' terminals each display within the presence area the videos of the visiting and visited users, whereas no image or video is displayed in the access area.

Finally, the visiting and visited users are in video and audio communication in the visited user's personal space.

The invention described here relates to a method and server for establishing a multimedia communication between at least two users over a packet network. According to one embodiment of the invention, the steps of the inventive method are determined by the instructions of a computer program incorporated into a server, such as the communication server SC. The program comprises program instructions, which when said program is loaded and executed within the server, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method for setting up a multimedia communication between a visited user and at least one visiting user who are both initially virtually present respectively within different virtual spaces in a virtual environment managed by a server to which respective terminals of the visiting and visited users are connected, wherein the method comprises:
   effecting a first virtual movement of the visiting user to a first virtual space, said first virtual space providing access to a second virtual space different from the first virtual space, said second virtual space being one in which the visited user is virtually present;
   setting up a video communication between the visited user and the visiting user in response to the first virtual movement;
   effecting a second virtual movement of the visiting user from the first virtual space to the second virtual space; and
   setting up an audio communication between the visited user and the visiting user in response to the second virtual movement.

2. The method according to claim 1, wherein the visited user receives at least one of a visual or audible notification of the first virtual movement before the video communication between the visited user and the visiting user is set up.

3. The method according to claim 1, wherein the second virtual movement is effected in response to a request of the visiting user, provided the visited user had previously authorized the visiting user to access the second virtual space.

4. The method according to claim 3, wherein the second virtual space is associated with a lock identifier in a first state, initially configured by the visited user.

5. The method according to claim 1, wherein the second virtual movement is effected in response to a request of the visited user.

6. The method according to claim 5, wherein the second virtual space is associated with a lock identifier in a second state or a first state, initially configured by the visited user.

7. The method according to claim 1, wherein during the video communication between visited and visiting users, no video communication flow emitted by the visited user is received by the visiting user.

8. The method according to claim 7, wherein the second virtual space is associated with a transparency indicator in a first state, initially configured by the visited user.

9. The method according to claim 7, wherein no video communication flow emitted by the visiting user is received by the visited user.

10. The method according to claim 9, wherein the second virtual space is associated with a transparency indicator in a second state, initially configured by the visited user.

11. The method according to claim 1, wherein the audio communication is not set-up in a time period after the first virtual movement and before the second virtual movement.

12. The method according to claim 1, wherein setting up the video communication precedes setting up the audio communication by some time period.

13. A server for setting up a multimedia communication between a visited user and at least one visiting user who are both initially virtually present respectively within different virtual spaces in a virtual environment managed by the server to which respective terminals of the visiting and visited users are connected, wherein the server is operative to perform the steps of:
  setting up a video communication between the visited user and the visiting user in response to a first virtual movement of the visiting user to a first virtual space, said first virtual space providing access to a second virtual space different from the first virtual space, said second virtual space being one in which the visited user is virtually present, and
  setting up an audio communication between the visited user and the visiting user in response to a second virtual movement of the visiting user from the first virtual space to the second virtual space.

14. The server according to claim 13, wherein the audio communication is not set-up in a time period after the first virtual movement and before the second virtual movement.

15. The server according to claim 13, wherein setting up the video communication precedes setting up the audio communication by some time period.

16. A non-transitory machine readable media including a computer program capable of being implemented within a server for setting up a multimedia communication between a visited user and at least one visiting user who are both initially virtually present respectively within different virtual spaces in a virtual environment managed by the server to which respective terminals of the visiting and visited users are connected, said program including instructions which, whenever the program is loaded and executed within said server, carry out the following steps:
  effecting a first virtual movement of the visiting user to a first virtual space, said first virtual space providing access to a second virtual space different from the first virtual space, said second virtual space being one in which the visited user is virtually present;
  setting up a video communication between the visited user and the visiting user in response to the first virtual movement;
  effecting a second virtual movement of the visiting user from the first virtual space to the second virtual space; and
  setting up an audio communication between the visited user and the visiting user in response to the second virtual movement.

17. The machine readable media according to claim 16, wherein the audio communication is not set-up in a time period after the first virtual movement and before the second virtual movement.

18. The machine readable media according to claim 16, wherein setting up the video communication precedes setting up the audio communication by some time period.

* * * * *